United States Patent [19]  [11] 4,349,577
Tessler  [45] Sep. 14, 1982

[54] STARCH-PROTEIN CLOUDS AND PRECLOUDS

[75] Inventor: Martin M. Tessler, Edison, N.J.

[73] Assignee: National Starch and Chemical Corp., Bridgewater, N.J.

[21] Appl. No.: 194,494

[22] Filed: Oct. 6, 1980

[51] Int. Cl.$^3$ .............................................. A23L 2/00
[52] U.S. Cl. .................................... 426/590; 426/661; 426/594
[58] Field of Search ............... 426/590, 591, 594, 599, 426/650, 656, 661, 657, 471

[56] References Cited

U.S. PATENT DOCUMENTS

| | | | |
|---|---|---|---|
| 3,353,961 | 11/1967 | Simon | 99/78 |
| 3,652,291 | 3/1972 | Bedoukian | 99/78 |
| 3,658,552 | 4/1972 | Carlson et al. | 99/118 |
| 3,862,342 | 1/1975 | Maraulja et al. | 426/599 |
| 3,917,852 | 11/1975 | Maraulja et al. | 426/599 |
| 3,959,510 | 5/1976 | Felton et al. | 426/548 |
| 4,084,012 | 4/1978 | Krumel et al. | 426/590 |
| 4,093,750 | 6/1978 | Babayan | 426/250 |
| 4,159,982 | 7/1979 | Hermannson | 260/119 |
| 4,187,326 | 2/1980 | Serafino et al. | 426/590 |

FOREIGN PATENT DOCUMENTS

| | | | |
|---|---|---|---|
| 1537160 | 12/1978 | United Kingdom | 2/23 L |
| 1569292 | 6/1980 | United Kingdom | 3/23 L |

OTHER PUBLICATIONS

Starches for Encapsulation, J. O'Dell Food Process, Inc. 41 #493 (1927) pp. 36 & 45.
Clarifying the Clouding Agent Picture, A. Oppenheimer, (Jun. 1974) pp. 60, 62 & 64.
Clouding Agents for the Food Industry, A. Oppenheimer, Food Products Dev. 5, #3 (1971) pp. 90–94.
Physical Factors Governing the Stabilization of Cloudy Beverages, D. Mellillo.
Breakfast Orange Drink Scores Formulation Breakthrough, Processed Prepared Food, Jun. 1980, p. 116.
Beverages: Carbonated and Noncarbonated, J. G. Woodroof & G. F. Phillips, The Avi Publishing Co., Inc. (1974) pp. 146–153.

Primary Examiner—Raymond N. Jones
Assistant Examiner—Elizabeth J. Curtin
Attorney, Agent, or Firm—Edwin M. Szala; Margaret B. Kelley

[57] ABSTRACT

Starch-protein clouds useful for clouding acidic fluids, especially fruit-flavored beverages, are prepared by forming an aqueous dispersion of from 3–15 parts of a starch base and 1 part of a water-soluble protein salt, such as the sodium and/or calcium salts of casein, a soy protein, or a wheat protein and then acidifying to a pH of about 2.5–5.5 to develop the cloud. The cloud may be isolated by spray drying or freeze drying to give a dry cloud suitable for incorporation in dry beverage mixes. Preclouds may be prepared in the same manner except that they are not acidified prior to use, but during use. Dry preclouds may be isolated by drum drying or freeze drying.

16 Claims, No Drawings

STARCH-PROTEIN CLOUDS AND PRECLOUDS

BACKGROUND OF THE INVENTION

This invention relates to the use of starch-protein products as preclouding and clouding agents for acidic fluids, especially as dry clouding agents suitable for incorporation in dry beverage mixes. It also relates to a process for preparing these liquid and dry preclouding and clouding agents.

As used herein, the term acidic "fluids" refers to fluids having a pH of 5.5 or less which are capable of flow and which may contain particulate solids or gases dispersed therein. The term "clouding agents", hereafter described as "clouds", refers to acidified substances or systems, such as liquid clouds, which already have a cloudy (opaque) appearance and which will maintain that cloudy appearance in acidic fluids, as well as to acidified substances or systems, such as dry clouds, which will have a cloudy appearance in acidic fluids. The term "preclouding agents", hereafter described as "preclouds" refers to substances or systems, both liquid and dry, which are non-acidified but which will develop a cloud when added to acidic fluids. The term "opacity" refers to the level of light transmittance of solutions.

In the art of clouding fluids, especially in an attempt to achieve the desired opacity or cloud inherent in natural juices, it is known and standard practice to form oil-in-water emulsions using edible oils. In bottled beverages the cloud has been typically provided by citrus oils in the case of citrus flavored beverages or by neutral vegetable oils (e.g. coconut oil) in the case of non-citrus flavored beverages, which cloud may be enhanced by the presence of weighting oils in the beverage. In dry beverage mixes the cloud has been provided by incorporating dry clouding agents prepared by spray drying emulsions containing plastic fats, typically hydrogenated coconut oil (U.S. Pat. No. 3,023,106) or hydrogenated coconut oil, inorganic pigments such as titanium dioxide, and hydrocolloids such as gum Arabic (U.S. Pat. No. 3,658,522).

A major drawback in the use of these clouds is the development of an off-taste, an undesirable soapy taste, which is due to oxidated rancidity and hydrolysis of the oil and fat. This problem is compounded because the off-taste develops during storage and may not be discovered until the product is sold. Development of this off-taste in bottled and canned beverages may be due to factors such as heat and/or sunlight. In dry beverage mixes development of the off-taste may be due to various factors, such as incomplete fixing of the fat initially, release of the fat during processing (due to the mechanical force and/or heat developed during ribbon blending), or adverse storage conditions (i.e. high heat and humidity). The presence of the fat leads to further problems such as clumping of the mix and insolubility of the mix when reconstituted in water. The use of antioxidants to overcome the off-taste problem is undesirable and often limited by government regulations. Hence, the search has begun for an oil- and fat-free clouding agent.

Two stable dry clouds have been described in the recent literature. One is a fat-free cloud prepared by co-drying an aqueous dispersion containing a major amount of a solubilized malto dextrin and a minor amount of xanthan gum and titanium dioxide (U.S. Pat. No. 4,187,326). The other involves the combination of a non-dairy base and a new orange flavor emulsion to provide the cloud ("Breakfast Orange Drink Scores Formulation Breakthrough", Processed Prepared Food, June 1980, p. 116). The non-dairy base is a component of the stabilizer, which also contains pectin, carboxymethyl cellulose, xanthan gum and carrageenan gum. Typically non-dairy bases are stabilized dried emulsions containing 20 to 50% oil or fat.

It is an object of this invention to provide a simple oil- and fat-free cloud and precloud which may be used in acidic fluids, especially in beverages and beverage mixes.

SUMMARY OF THE INVENTION

The above object is achieved by the preparation of starch-protein clouds and preclouds which can be used as liquid or dry clouds or preclouds in acidic fluids, acidic dry mixes, or dry mixes to be reconstituted with acidic fluids. The clouds are prepared from an aqueous dispersion of various starches and selected water-soluble protein salts and developed by acidification. They may be isolated as dry clouds, typically by spray drying or freeze drying. The liquid and dry preclouds are prepared in the same manner except that they are not acidified prior to use, and the cloud is developed during use by acidification. Dry preclouds may be isolated by freeze drying or drum drying.

DESCRIPTION OF THE PREFERRED EMBODIMENTS

The applicable starch bases which may be used in preparing the starch-protein products herein may be derived from any plant source including corn, potato, sweet potato, wheat, rice, sago, tapioca, waxy maize, sorghum, or the like. Also included are the conversion products derived from any of the latter bases including, for example, oxidized starches prepared by treatment with oxidants such as sodium hypochlorite; fluidity or thin-boiling starches prepared by enzyme conversion or mild acid hydrolysis; and derivatized starches such as ethers and esters. The starch base may be a granular starch, which will be dispersed prior to or during formation of the cloud or precloud, or it may be a gelatinized starch (i.e. a precooked, non-granular starch). Converted starches, typically a waxy maize starch having a water fluidity (WF) of about 40 to 60, are preferred when the cloud is to be isolated by spray drying, preferably at a solids content of about 10 to 30% by weight. A waxy maize starch is preferred when the cloud is to be isolated by freeze drying or when the precloud is to be isolated by freeze drying or drum drying.

The applicable protein salts which may be used in preparing the starch-protein clouds and preclouds herein are the water-soluble salts of soybean and wheat proteins or preferably casein. The salts, typically sodium or calcium salts, may be prepared by solubilizing the proteins by increasing the pH of an aqueous mixture containing the protein to about 13 using sodium or calcium hydroxide or any other alkali capable of forming a water-soluble salt. Water-soluble sodium and calcium caseinates are commercially available as milk by-products.

The clouds and preclouds may be formed in various ways depending upon the starting materials used and the isolation method used. If the water-insoluble protein is used as the starting material, it is first solubilized as described above and then added to the dispersed or granular starch. If the water-soluble protein salt is used as the starting material, it may be added directly to a starch dispersion prepared from a pregelatinized starch or prepared by cooking a granular starch. Alternatively, the granular starch and protein salt may be cooked together in water for about 10 to 30 minutes at a temperature which is above the gelatinization temperature of the particular granular starch used. If the precloud is to be isolated by drum drying, it is not necessary to precook the slurry of granular starch and protein salt since the starch will be cooked and dispersed during the drying operation.

Acidification of the starch-protein dispersion to a pH between about 3.25 and 5.5 leads to development of the cloud, with the preferred pH range depending on the protein selected. For casein the preferred pH range is about 4–5. The resulting liquid cloud may be used as is or it maybe isolated to be used as a dry cloud. Alternatively, the starch-protein product may be isolated from the dispersion prior to acidification to provide a dry precloud which may be used as is or reconstituted with an acid as a liquid cloud. If the starch-protein dispersion is not acidified, it is used as a liquid precloud. The isolation method used in the recovery of the dry clouds and preclouds will determine when acidification should occur.

If the cloud is to be isolated by spray drying, it is preferable to acidify the dispersion prior to drying. Spray dried preclouds prepared from non-acidified starch-protein dispersions do not provide good clouds even in fluids having a pH in the preferred range used in the acidification step.

If the precloud is to be isolated by drum drying, the granular starch-protein slurry may be drum dried at an acid pH, as will occur when a water-soluble sodium or potassium caseinate are used or when the solubilized protein is acidified subsequent to solubilization at a high pH. However, the protein must remain in solution, and hence the pH of the slurry must be above the pH at which the particular protein agglomerates (e.g. about 4.8, 5.5, and 6.5 for casein, soy protein, and wheat protein, respectively). Drum drying adversely affects the stability of some of the clouds (i.e. they settle out), particularly the soy and wheat proteins which do not form stable clouds even when cooked prior to acidification. Drum drying also adversely affects starch-casein slurries dried at acid pH values, and the resulting preclouds do not form stable clouds when acidified unless they are cooked prior to acidification. If used in a hot fluid or mix to be reconstituted with a hot fluid, cooking will not be necessary. Preferably starch-casein slurries are drum dried at an alkaline pH, and the resulting preclouds do not have to be cooked prior to acidification to form stable clouds.

Preclouds may be isolated by freeze drying. They develop stable clouds and there is no need to cook the precloud prior to acidification. The drum dried and freeze dried preclouds are ground to a finely divided state prior to use.

The cloud intensity (degree of cloudiness) is a function of the type of starch and protein used and the starch to protein ratio, as well as the amount of cloud used. The starch to protein ratio may vary from about 2.5 to 15:1, preferably about 3:1 to 9:1 depending on the starch base used. The intensity of the cloud also varies depending upon the pH used in the acidification step. Below pH 2.25 or above pH 6.5 only poor clouds develop. The best clouds develop in water at a pH between about 3.25 and 5.5 or as low as 2.5–3.0 if sulfate ions are present. The intensity of the cloud varies slightly depending upon the acid used to develop the cloud. Hydrochloric, phosphoric, sulfuric, adipic, citric, and nitric acids are typical acids which can be used to develop the clouds.

The stability of the clouds also varies depending upon the type of starch base used and the ratio of starch to protein. Some clouds will be relatively unstable, as for example, a corn starch-casein cloud (3:1) which at 0.4% solids in water at pH 4.0 was very cloudy, but which settled slowly over about one hour. However, oxidized corn starch and derivatized corn starches (i.e. treated with monofunctional reagents such as acetic anhydride and propylene oxide) form stable clouds.

The starch-protein clouds may also be sensitive, during formation, development, and/or use to ions other than those present in the acids used to develop the cloud. As previously discussed, they are also sensitive to the time acidification is affected and to the drying method used.

The practitioner will recognize that each system to be clouded is unique and that each starch-protein cloud may give better or poorer clouds depending on the type of starch used, the type of protein used, the ratio of starch to protein, the pH at which the cloud is developed and used, the presence of salts and/or other ions, and, in the case of dry clouds and preclouds, the drying method used. The clouds and preclouds should be evaluated in the presence of the components typically present in the fluid or mix to be clouded, and some of these components may themselves provide some clouding.

In the case of beverages and beverage mixes, the clouds should be evaluated in the presence of flavorants (e.g. flavor extracts or essences in alcohol, glycerol or propylene glycol, essential flavor oil emulsions, and fruit juice concentrates); weighting oils (e.g. Ester gum and brominated vegetable oils); sweeteners (e.g. dextrose, sucrose, maltose, fructose, aspartame, certain dipeptides, and saccharin); edible acids (e.g. citric, phosphoric, lactic, adipic, tartaric, hexamic, fumaric, and malic); natural or artificial colorants; carbonation sources (e.g. carbon dioxide and sodium, potassium, and ammonium (bi)carbonates); encapsulating materials (e.g. gum Arabic, modified food starches, dextrins, cellulose esters and ethers, and gelatin); preservatives (e.g. sodium benzoate and methyl- or propyl-p-hydroxybenzoate); and the like.

The clouds and preclouds are added to acidic fluids, acidic dry mixes to be reconstituted as acidic fluids, or dry mixes to be reconstituted with acidic fluids in amounts sufficient to provide the desired cloud in the final product. Typically from 0.1 to 1.0%, based on the total fluid weight, will provide good clouds, with the intensity depending on the cloud or precloud selected and the amount used, as well as the fluid's pH in the case of preclouds.

The clouds and preclouds are especially useful in beverages or dry beverage mixes since they have no residual flavor of their own and since they are effective in the acidic pH range encountered in most beverages (e.g. bottled and canned soft drinks, breakfast and alcoholic dry beverage mixes, fruit juices, wines, etc). Unless isolated by drum drying, they are readily dispersed in cold water, a factor which makes their addition at any of stage of the beverage preparation practical. Dry clouds and preclouds can be dry blended with dry mixes or dry or liquid clouds or preclouds may be added to flavor concentrates, syrups, or to the finished beverages.

It is not known whether the starch and protein react in any manner during formation of the cloud or precloud or during the development of the cloud by acidification. It is known that the starch-protein clouds and preclouds must be formed from dispersed starches and that good clouds develop only after acidification of the mixture of dispersed starch and solubilized protein to a preferred pH range. It is believed that the presence of the dispersed starch allows the solubilized protein, when acidified, to coagulate as microscopic particles which provide the cloud. If starch is not present when the protein solution is acidified or if insufficient starch (e.g. 1:1 starch to protein ratio) is present, the protein agglomerates and no cloud forms. In addition, the dispersed starch may act as a protective hydrocolloid in preventing settling out of the protein particles.

As used herein, the term "agglomerate" refers to the formation, as the pH is lowered, of discrete insoluble particles of protein, which may or may not clump together depending upon the system used and the protein used. It is possible that the agglomerated protein may carry down or entrap some of the dispersed starch. In the presence of sufficient dispersed starch this does not occur; no visible particles form and the dispersion resembles an oil-in-water emulsion.

The following examples will more fully illustrate the embodiments of this invention. In the examples, all parts and percentages are given by weight and all temperatures are in degrees Celsius unless otherwise noted. The light transmittance was measured using a Spectronic 20 Spectrophotometer set at 540 nm. The lower the light transmittance, the better the clouding.

EXAMPLE I

This example illustrates the preparation of liquid starch-protein clouds and their use in a reconstituted beverage.

Cloud I-A (9:1) was prepared by adding 9 parts of a waxy maize starch (which had been acid converted to a degree known in the trade as 50 WF) and 1 part of sodium caseinate to 141 parts water and cooking in a boiling water bath for 20 mins. The pH was lowered from 5.5 to 4.0 with 0.1 N hydrochloric acid. A total of 3 parts of the resulting liquid cloud (6.5% solids) was added to a beverage prepared by adding 100 parts of water to 13.3 parts of a cloudless orange beverage powder. The clouded beverage had a light transmittance at 540 nm of 15.9% compared with 49.0% for the cloudless beverage.

Cloud I-B (3:1) was prepared in the same manner except that 3 parts of a waxy maize starch and 1 part sodium caseinate were cooked in 64 parts water. A total of 3.5 parts of the resulting liquid cloud (5.8% solids) was added to the beverage. The clouded beverage had a light transmittance at 540 nm of 4.8%.

EXAMPLE II

This example illustrates the preparation of various liquid clouds using different starches and varied starch to casein ratios.

The clouds were prepared by dry blending the starch and sodium caseinate, adding sufficient water to give a solids content of 5-20%, cooking for 20 mins in a boiling water bath, and lowering the pH from about 5.5 to 4.0 with hydrochloric acid. The starch bases used were waxy maize; tapioca; potato; a crosslinked, derivatized waxy maize prepared by treatment with 7.0% propylene oxide and 0.014% phosphorus oxychloride; a derivatized 75 WF corn starch prepared by oxidation with sodium hypochlorite; and a derivatized 72 WF corn starch prepared by acid hydrolysis followed by acetylation with 4% acetic anhydride. They were evaluated by measuring the transmittance in water after dilution to 0.2% solids and comparing the values with that of a control containing 0.2% starch solids by weight. The data is summarized in Table I.

TABLE I

| Starch | Cloud Starch:Casein Ratio | Transmittance (% at 540 nm) |
|---|---|---|
| Waxy maize (control) | — | 73.0 |
| Waxy maize | 9:1 | 24.5 |
| Waxy maize | 3:1 | 4.9 |
| Tapioca (control) | — | 83.6 |
| Tapioca | 9:1 | 25.2 |
| Tapioca | 3:1 | 5.1 |
| Potato (control) | — | 97.5 |
| Potato | 9:1 | 73.5 |
| Potato | 3:1 | 15.0 |
| Modified Waxy Maize (control) | — | 53.8 |
| Modified Waxy Maize | 9:1 | 31.4 |
| Modified Waxy Maize | 3:1 | 5.0 |
| 75 WF Corn (control) | — | 82.0 |
| 75 WF Corn | 9:1 | 72.0 |
| 75 WF Corn | 3:1 | 54.0 |
| 72 WF Modified Corn (control) | — | 69.0 |
| 72 WF Modified Corn | 9:1 | 39.0 |
| 72 WF Modified Corn | 3:1 | 8.1 |

The results show that all of the starch-casein clouds were better than starch alone, that all of the clouds were excellent clouds at the 3:1 ratio, and that most of the clouds were very good even at the 9:1 ratio.

EXAMPLE III

This example illustrates the preparation of additional liquid clouds using different starches and different proteins.

The clouds were prepared by cooking the starch (1.8 and 1.2 parts starch for the 9:1 and 6:1 clouds, respectively) in 28.2 parts water for 20 mins, cooling to room temperature, adding 5 parts of a 4% protein solution, and then lowering the ph to 4 with 0.1 N hydrochloric acid. The clouds were diluted to the indicated solids content with water and then evaluated. In the preparation of the protein solutions, calcium caseinate went into solution (pH 5.7) without pH adjustment, but Supro 350 and Whetpro 80 had to be adjusted to pH 13 with 25% sodium hydroxide to solubilize the proteins. Supro and Whetpro are trade names for soy and wheat proteins marketed by Ralston Purina Co. and Industrial Grain Products, respectively. The data is summarized in Table II.

TABLE II

| Starch-Protein | Ratio | Solids (% based on water) | Transmittance (% at 540 nm) |
|---|---|---|---|
| 50 WF Waxy maize-Calcium caseinate | 9:1 | 0.4 | 26.0 |
| 50 WF Waxy maize-Calcium caseinate | 9:1 | 0.2 | 47.5 |
| 50 WF Waxy maize-Whetpro 80 | 9:1 | 0.4 | 37.2 |
| 50 WF Waxy maize-Whetpro 80 | 9:1 | 0.2 | 50.0 |
| 50 WF Waxy maize-Supro 350 | 9:1 | 0.4 | 25.9 |
| 50 WF Waxy maize-Supro 350 | 9:1 | 0.2 | 58.2 |
| 50 WF Waxy maize-Gelatin | 9:1 | 0.2 | a. |
| 50 WF Waxy maize-Egg white | 9:1 | 0.2 | a. |

TABLE II-continued

| Starch-Protein | Ratio | Solids (% based on water) | Transmittance (% at 540 nm) |
|---|---|---|---|
| soilds[b] | | | |
| Waxy maize-Calcium caseinate | 6:1 | 0.4 | 12.1 |
| Waxy maize-Calcium caseinate | 6:1 | 0.2 | 21.5 |
| Waxy maize-Whetpro 80 | 6:1 | 0.4 | 29.0 |
| Waxy maize-Whetpro 80 | 6:1 | 0.2 | 42.2 |
| Waxy maize-Supro 350 | 6:1 | 0.4 | 13.0 |
| Waxy maize-Supro 350 | 6:1 | 0.2 | 36.7 |

[a] Transmittance was not measured as no cloud formed on acidification to pH 3.0, 3.5, 4.0 and 5.0.
[b] Albumin protein The results show that the soy and wheat proteins formed starch-protein clouds which were almost as effective as the starch-casein clouds and that proteins, such as gelatin and albumin do not form starch-protein clouds.

EXAMPLE IV

This example illustrates the preparation of spray dried starch-protein clouds (9:1) and their use in a beverage powder.

Cloud IV-A was prepared by adding 100 parts of a waxy maize starch (which had been acid-converted to a degree known in the trade as 50 WF) to 300 parts water, cooking the suspension (pH 5.6) in a boiling water bath for 20 mins, and cooling the resulting starch dispersion to 45° C. In a separate vessel 11.1 parts casein were added to 80 parts water and then 43.6 parts of 3% aqueous sodium hydroxide were added to form a sodium caseinate solution (pH 13.0). Additional water was added to the sodium caseinate solution to bring the total weight to 150 parts, the solution was then added to the starch dispersion at 45° C., and the pH was lowered from 11.2 to 5.0 with 9.7 parts of 10% aqueous hydrochloric acid. An additional 200 parts of water were added, and the cloud was isolated by spray-drying (inlet and outlet temperatures of the tower were 200°–210° C. and 105°–115° C., respectively). The dry powder was screened through a 40 mesh screen.

Cloud IV-B was prepared in the same manner except that 11.1 parts of sodium caseinate were dissolved in 138.9 parts water and after addition of the sodium caseinate solution to the starch dispersion the pH was lowered from 6.25 to 5.0 with 1.4 parts of 10% aqueous hydrochloric acid.

Cloud IV-C was prepared in the same manner as Cloud IV-B except that the pH was lowered to 2.5 with sulfuric acid prior to spray drying.

Clouds IV-A to IV-C were dry blended with a cloudless orange beverage powder (pH 3.1) using 0.2 parts of cloud and 13.3 parts powder, and the powder was then reconstituted by adding 100 parts water. The transmittance of the resulting beverages was measured and compared with that of beverages prepared from two clouded reconstituted orange beverage powders using the cloudless orange beverage powder as the control. The results are given in Table III.

TABLE III

| Beverage (0.2% cloud solids based on water) | Transmittance (% at 540 nm) |
|---|---|
| IV-A | 25.5 |
| IV-B | 31.0 |
| IV-C | 15.1 |
| Cloudless (control) | 51.0 |
| Clouded (comparative)[1] | 21.0 |
| Clouded (comparative)[2] | 6.5 |

[1] Prepared from the cloudless orange beverage powder to which had been added 0.2 part of a commerical beverage cloud marketed by Borden.
[2] Prepared from a commercially available orange beverage powder.

The results show that dry clouds can be prepared by spray drying.

EXAMPLE V

This example illustrates the preparation of additional spray dried clouds from a 50 WF waxy maize starch and casein (9:1 and 15:1). It shows the effect on the transmittance of the pH used in the formation of dry clouds.

Unless otherwise noted the clouds were prepared in the same manner as Cloud IV-A of Example IV except that the pH was lowered to the indicated levels prior to spray drying. The coluds were evaluated, as described in Example IV, using a cloudless orange beverage powder as the control. The data is given in Table IV.

TABLE IV

| Cloud Formation pH | Beverage Evaluation | |
|---|---|---|
| | Cloud Solids (%) | Transmittance (% at 540 nm) |
| 5.0 | 0.1 | 14.1 |
| 5.0 | 0.2 | 8.5 |
| 5.0 | 0.3 | 5.0 |
| 5.0 | 0.4 | 4.2 |
| 5.0 | 0.6 | 2.3 |
| 4.0* | 0.2 | 7.0 |
| 3.25* | 0.2 | 6.0 |
| 10.0 | 0.2 | 39.9 |
| 7.8 | 0.2 | 28.3 |
| 7.0 | 0.2 | 28.0 |
| 6.1 | 0.2 | 24.0 |
| 5.0 | 0.2 | 13.0 |
| 5.0** | 0.2 | 12.9 |
| 2.6 | 0.2 | 27.0 |
| — | —(control) | 49.0 |

*Prepared using a commercially available sodium caseinate rather than solubilized casein.
**Prepared using a 15:1 starch-casein ratio; all others prepared using the 9:1 starch-casein ratio.

The results show that increasing the amount of cloud solids in the beverage decreased the transmittance (i.e. increased cloud intensity) and that even at 0.1% solids the transmittance was much lower than that of the control. The optimum pH for spray drying is about 3.0 to 5.0. At pH 10 almost no cloud formed, and the spray dried product had a transmittance which was not much better than the control. When added to water at pH 4, 3.5, and 3, it formed no cloud.

EXAMPLE VI

This example illustrates the preparation of freeze-dried preclouds.

Precloud VI-A was prepared by cooking a mixture of 30.0 parts waxy maize starch and 10.0 parts sodium caseinate in 140 parts distilled water for 20 mins at pH 6.6. It was isolated by freeze drying, ground, and evaluated as a cloud (0.4% solids) in water adjusted to pH 4.0 with hydrochloric acid. The light transmittance at 540 nm was 1.8%.

Precloud VI-B was prepared in the same way except that the freeze dried precloud was cooked in water for about 20 minutes (pH was about 5.5). It was then cooled and adjusted to pH 4.0 with hydrochloric acid. The light transmittance at 540 nm was 1.0%.

The results show that freeze drying did not adversely affect development of the cloud and that it is not necessary to cook the precloud prior to acidification.

EXAMPLE VII

This example illustrates the preparation of drum dried preclouds and determines the lowest pH at which the granular starch slurries can be drum dried.

Part A-Preparation and Evaluation of Preclouds

Preclouds VII-A to F (3:1) were prepared by dissolving 10.0 parts sodium caseinate in 100 parts water by rapidly stirring for about 1 hour at room temperature, then adding about 30.0 parts waxy maize starch, and drum-drying the resulting slurry after adjustment to the indicated pH values using 0.1 N HCl or 3% aqueous NaOH.

Preclouds VIIG and VIIH were prepared as above except that Supro 350 and Whetpro 80 were used instead of sodium caseinate and they were solubilized in water at about pH 10.5-11.0, the starch was added, and then the pH was adjusted to pH 7.5 with 10% aqueous hydrochloric acid.

The resulting preclouds were ground to form a powder and evaluated in the uncooked and cooked form at 0.4% solids in cold water at pH 4.0. The results are given in Table V.

TABLE V

| Precloud | pH at Drum Drying | Transmittance (% at 540 nm) | |
|---|---|---|---|
| | | Uncooked | Cooked[a] |
| VII-A | 5.5 | 2.0[b] | 2.0 |
| VII-B | 6.6[c] | 3.0[b] | 2.0 |
| VII-C | 7.5 | 1.2 | 4.0 |
| VII-D | 8.5 | 11.0[d] | 3.0[d] |
| VII-E | 9.5 | 3.0[d] | 4.0[d] |
| VII-F | 10.5 | 5.5[d] | 6.0[d] |
| VII-G | 7.5 | 28.0[b] | 12.2[b] |
| VII-H | 7.5 | 40.0[b] | 29.0[b] |

[a] The ground preclouds were cooked for 20 mins, cooled, and then adjusted to pH 4.0.
[b] Settled out rapidly
[c] The slurry was cooked prior to drum drying and the resulting dispersion was drum dried after dilution with an additional 150 ml of water to lower the viscosity.
[d] Clouds were stable and there was no settling even after 24 hrs.

The results show that all of the preclouds can be drum dried, but that drum drying adversely affects the stability of some of the clouds which developed on acidification of the precloud. The clouds developed from the starch-Supro 350 precloud (VII-G) and starch-Whetpro 80 precloud (VII-H) were not stable even when cooked prior to acidfication. Clouds developed from the starch-casein preclouds drum dried at the lower pH values (VII-A & B) were not stable, but could be stabilized by cooking prior to acidification, while those developed from starch-casein preclouds drum dried at the high pH values (VII-D, E, & F) were very stable at pH 4.0 and did not require cooking prior to acidification.

Part B-Determination of Lowest pH for Drum Drying Preclouds

A total of 21 parts waxy maize starch was slurried with 7 parts of protein dissolved in 100 parts of distilled water, and the pH was lowered slowly with 0.1 N HCl to the point at which the protein agglomerated. Whetpro 80 and Supro 350 were initially solubilized at about pH 11.0 and agglomerated at pH 6.5 and 5.5, respectively. Sodium caseinate went into solution at pH 6.5 and agglomerated at pH 4.8.

EXAMPLE VIII

This example shows the effect of the acid used to lower the pH on the cloud's intensity.

The clouds were prepared and evaluated as in Example III except that 1.8 parts of a 50 WF waxy maize starch and 10 parts of a solubilized 2% sodium caseinate solution were used. The results are given in Table VI.

TABLE VI

| Acid Used | Cloud Solids (% based on water) | Transmittance (% at 540 nm) |
|---|---|---|
| 10% Hydrochloric | 0.4 | 17.0 |
| 10% Hydrochloric | 0.2 | 37.9 |
| 50% Phosphoric | 0.4 | 16.0 |
| 50% Phosphoric | 0.2 | 43.5 |
| 25% Sulfuric | 0.4 | 10.8 |
| 25% Sulfuric | 0.2 | 24.0 |
| 25% Adipic | 0.4 | 6.5 |
| 25% Adipic | 0.2 | 23.0 |
| 50% Citric | 0.4 | 9.0 |
| 50% Citric | 0.3 | 14.0 |
| 50% Citric | 0.2 | 23.0 |
| 50% Citric | 0.1 | 48.0 |
| 25% Nitric | 0.4 | 15.0 |
| 25% Nitric | 0.2 | 39.0 |

The results show that the cloud's intensity was affected by the acid used to form the cloud. Citric, adipic, and sulfuric acid gave somewhat better clouds than hydrochloric, phosphoric, and nitric acid.

EXAMPLE IX

This example demonstrates the effect of the fluid's pH on the opacity of both a spray dried cloud and a liquid precloud.

PART A-Spray Dried Cloud

Cloud IV-A of Example IV (spray dried at a pH of 5.0) was added to water at 0.4% solids, the pH was adjusted to the indicated levels using aqueous hydrochloric acid and/or aqueous sodium hydroxide, and the transmittance was measured. The data is summarized in Table VII.

TABLE VII

| pH | Transmittance (% at 540 nm) |
|---|---|
| 1.5 | 39.0 |
| 2.25 | 31.2 |
| 2.5 | 19.6 |
| 3.0 | 14.1 |
| 4.0 | 6.7 |
| 5.0 | 9.0 |
| 5.25 | 10.0 |
| 5.75 | 16.6 |
| 6.0 | 24.0 |
| 6.25 | 29.7 |
| 6.75 | 59.0 |
| 7.15 | 63.5 |
| 7.75 | 67.8 |

Part B-Liquid Precloud

A liquid precloud (3:1) was prepared by adding 76.4 parts of water to a mixture of 3.6 parts of a waxy maize starch and 1.2 parts of sodium caseinate. The dispersion was cooked in a boiling water bath for 20 mins. and cooled to room temperature. The pH of the relatively clear solution was 6.4. The pH was consecutively adjusted with 0.1 N hydrochloric acid to the value indicated in Table VIII and an aliquot was removed at each pH. The aliquots were diluted to 0.2% solids with water, and the transmittance was then measured. The data is summarized in Table VIII.

TABLE VIII

| pH | Transmittance (% at 540 nm) |
|---|---|
| 6.4 | 70.2 |
| 6.0 | 60.5 |
| 5.5 | 27.2 |
| 5.0 | 5.0 |
| 4.0 | 23.9 |
| 3.5 | 28.8 |
| 3.25 | 33.0 |
| 3.0 | 64.1 |

The data shows that the cloud's intensity is a function of pH and that the pH at which the cloud is developed should be between about 3.25 and 5.5, preferably about 5.0 for waxy maize-casein clouds.

EXAMPLE X

This example demonstrates the effect of monovalent and polyvalent salts on the formation of a cloud and contrasts these effects with the effects of salts on the casein/starch complex described in U.S. Pat. No. 4,159,982.

A waxy maize-casein cloud (3:1) was prepared in the same manner as Cloud I-B of Example I except that 10% by weight of the indicated salts, based on the starch, were present during the formation of the cloud. The clouds were developed at the indicated pH values and evaluated in water at 0.2% solids. The results are given in Table IX.

TABLE IX

| Salt Added | Transmittance (% at 540 nm) | |
|---|---|---|
| | pH 3.0 | pH 4.0 |
| NaCl | 72.5 | 7.0 |
| $K_2SO_4$ | 25.0 | 6.0 |
| $Na_2SO_4$ | 32.0 | 6.0 |
| $NaH_2PO_4$ | 69.0 | 5.5 |
| Control* | 73.0 | 7.0 |

*No Salt was present during formation of the cloud.

The results show that the salts did not affect the development of the cloud at pH 4 and that only salts containing sulfate ions improved the development at pH 3.

The casein/starch complex of the above patent is formed by heating casein or caseinate and starch at a temperature above the starch gelation temperature for a period of time inadequate to cook the starch. The complex may be formed at a pH from 2-12, preferably from about 2-4 or 5-10. The addition of salts (e.g. NaCl, $Na_2HPO_4$, $NaH_2PO_4$, etc.) is preferred as they promote formation of the complex.

In contrast with the above casein/starch complex, the starch-protein clouds of this invention are formed from dispersed starches, which may be fully cooked, and they develop a good cloud only after acidification to a selected pH range (preferably 3.25-5.5). Further, as shown above, the addition of salts has a varying effect on formation and development of waxy maize-casein clouds. The same salts as those which promote formation of the complex (i.e. NaCl and $NaH_2PO_4$) did not affect formation and development of the cloud. Certain salts (i.e. those containing sulfate ions) improve cloud formation and development at a pH below the preferred pH range, but do not affect cloud formation and development at a pH within the preferred pH range.

EXAMPLE XI

This example describes the preparation of a fruit-flavored dry beverage mix containing a spray dried 50 WF waxy maize starch-casein cloud (9:1). The following formulation should be used:

| Ingredient | Percent |
|---|---|
| Sugar | 88.419 |
| Citric acid | 5.318 |
| Cloud | 1.504 |
| Flavor and Flavor Enhancers | 1.143 |
| Monocalcium phosphate | 1.137 |
| Potassium citrate | 0.780 |
| Calcium phosphate (dry) | 0.664 |
| Vitamin C | 0.511 |
| Carboxymethylcellulose | 0.460 |
| Vitamin A | 0.036 |
| Color | 0.028 |

Now that the preferred embodiments of the present invention have been described in detail, various modifications and improvements thereon will become readily apparent to those skilled in the art. Accordingly the spirit and scope of the invention are to be limited only by the appended claims and not by the foregoing specification.

I claim:

1. A liquid starch-protein precloud, useful in acidic fluids having a pH of about 3.25-5.5, prepared by forming an aqueous dispersion comprising about 2.5-15 parts of a dispersed cooked starch base and about 1 part of a water-soluble protein salt at a pH above that at which said protein agglomerates; said protein being insoluble at a pH of about 3.25-5.5 and being a casein, a soy protein, a wheat protein, or mixtures thereof.

2. A dry starch-protein precloud, useful in acidic fluids having a pH of about 3.25-5.5, prepared by forming an aqueous mixture comprising about 2.5-15 parts of a dispersed cooked starch base or a granular starch base and about 1 part of a water-soluble protein salt at a pH above that at which said protein agglomerates; isolating said precloud by freeze drying or by drum drying; and grinding said isolated precloud; said precloud being isolated by freeze drying or drum drying when prepared from said dispersed cooked starch base or being isolated by drum drying when prepared from said granular starch base, whereby said granular starch base is cooked and dispersed; said drum drying being carried out at a pH of about 5.5-10.5; said protein being insoluble at a pH of about 3.25-5.5 and being a casein, a soy protein, a wheat protein, or mixtures thereof.

3. The precloud of claim 2, wherein said precloud prepared from said granular starch base and said casein salt and drum dried at below pH 8.5 is cooked prior to or during use.

4. The precloud of claim 1 or 2, wherein said starch base is selected from the group consisting of a waxy maize starch, an acid hydrolyzed waxy maize starch, a derivatized waxy maize starch, a derivatized corn starch, a tapioca starch, and a potato starch.

5. The precloud of claim 4, wherein said starch base is used in an amount from about 3-9 parts and is said waxy maize starch, said acid hydrolyzed waxy maize starch having a water fluidity of about 40-60, or said tapioca starch, and said protein salt is sodium or calcium caseinate or mixtures thereof.

6. A liquid starch-protein cloud, useful in acidic fluids, prepared by forming an aqueous dispersion comprising 2.5–15 parts of a dispersed cooked starch base and about 1 part of a water-soluble protein salt at a pH above that at which said protein agglomerates and acidifying said dispersion to a pH below that at which said protein agglomerates to develop said cloud; said protein being a casein, a soy protein, a wheat protein, or mixtures thereof.

7. A dry starch-protein cloud, useful in acidic fluids, prepared by forming an aqueous dispersion comprising about 2.5–15 parts of a dispersed cooked starch base and about 1 part of a water-soluble protein salt at a pH above that at which said protein agglomerates, acidifying said dispersion to a pH below that at which said protein agglomerates to develop said cloud, isolating said cloud by spray drying or by freeze drying, and grinding said freeze dried cloud; said protein being a casein, a soy protein, a wheat protein, or mixtures thereof.

8. The cloud of claim 6 or 7, wherein said dispersion is acidified to a pH of about 3.25–5.0.

9. The cloud of claim 6 or 7, wherein said dispersion is acidified to a pH of about 2.5–5.5 in the presence of sulfate ions.

10. The cloud of claim 6 or 7, wherein said starch base is selected from the group consisting of a waxy maize starch, an acid hydrolyzed waxy maize starch, a derivatized waxy maize starch, a derivatized corn starch, a tapioca starch, and a potato starch.

11. The cloud of claim 10, wherein said starch base is used in an amount from about 3–9 parts and is said waxy maize starch, said acid hydrolyzed waxy maize starch having a water fluidity of about 40–60, or said tapioca starch; wherein said protein salt is sodium or calcium caseinate or mixtures thereof; and wherein said dispersion is acidified to a pH of about 4–5 using hydrochloric, phosphoric, sulfuric, citric, adipic, or nitric acid.

12. The method for clouding acidic fluids having a pH of about 3.25–5.5, which comprises adding the liquid starch-protein precloud of claim 1 to said acidic fluid, or to a dry mix which is to be reconstituted with said acidic fluid, or to an acidic dry mix which is to be reconstituted as said acidic fluid, said liquid precloud being added in an amount sufficient to provide from about 0.1 to 1.0% by weight of precloud solids, based on said total fluid.

13. The method for clouding acidic fluids having a pH of about 3.25–5.5, which comprises adding the dry starch-protein precloud of claim 2 to said acidic fluid, or to a dry mix which is to be reconstituted with said acidic fluid, or to an acidic dry mix which is to be reconstituted as said acidic fluid, said dry precloud being added in an amount from about 0.1 to 1.0% by weight of precloud solids, based on said acidic fluid.

14. The method for clouding acidic fluids, which comprises adding the liquid starch-protein cloud of claim 6 to said acidic fluid, or to a dry mix which is to be reconstituted with said acidic fluid, or to an acidic dry mix which is to be reconstituted as said acidic fluid, said liquid cloud being added in an amount sufficient to provide from about 0.1 to 1.0% by weight of cloud solids, based on said total fluid.

15. The method for clouding acidic fluids, which comprises adding the dry starch-protein cloud of claim 7 to said acidic fluid, or to a dry mix which is to be reconstituted with said acidic fluid, or to an acidic dry mix which is to be reconstituted as said acidic fluid, said dry cloud being added in an amount from about 0.1 to 1.0% by weight of cloud solids, based on said acidic fluid.

16. In a fruit-flavored, acidic dry mix to be reconstituted as a beverage, said mix comprising a sugar, an edible acid, a flavorant, and a colorant, the improvement comprising the presence of a dry starch-protein cloud, whereby said total dry beverage mix is storage stable and said reconstituted beverage prepared from said total dry mix has an opacity resembling the opacity of a natural fruit juice; said starch-protein cloud being prepared by forming an aqueous dispersion comprising about 2.5–15 parts of a dispersed cooked starch base and about 1 part of a water-soluble protein salt at a pH above that at which said protein agglomerates, acidifying said dispersion to a pH below that at which said protein agglomerates to develop said cloud, and isolating said cloud by spray drying or by freeze drying, and grinding said freeze dried cloud; said protein being a casein, a soy protein, a wheat protein, or mixtures thereof.

* * * * *